Patented May 12, 1931

1,805,353

UNITED STATES PATENT OFFICE

ERNST BERL, OF DARMSTADT, GERMANY

PROCESS FOR DECHLORINATING WATER

No Drawing. Application filed October 10, 1929, Serial No. 398,804, and in Germany May 10, 1926.

Impure waters are frequently treated with chlorine for example liquid chlorine or perchloride compounds, an excess of chlorine being generally used in order to destroy any infectious germs which are present.

The present invention relates to the dechlorination of such water.

It is well known that the chlorine excess can be removed by means of salts, as for example, sodium thio-sulphate. The water then, however, has a disagreeable salty taste. Endeavours have also been made to remove the chlorine by means of active carbon and the like. This process, however, is expensive as it only enables the dechlorination to be effected efficiently by the use of comparatively large quantities of active carbon, whilst finely divided particles of carbon pass off with the treated water and impart thereto a grey colouration.

It is also known to filter chlorinated water through substances such as peat, brown coal and the like. The use of such raw products is however liable to render the water impure.

According to the present invention the dechlorination of the water is effected by the treatment thereof with lignin. If the water is brought into intimate contact with lignin the chlorine contained therein combines completely with the lignin whilst forming tasteless and odourless lignin chloride.

Water which contains only small quantities of chlorine in excess may be used directly after treatment with lignin even also for edible purposes as the small quantities of lignin chloride contained therein do not have a disturbing effect.

It is however possible to readily remove the lignin chloride from the water for example in such a manner that it is filtered through carbon of different types as for example brown coal coke, brown coal, coal and so forth from which disturbing substances as for example ulmic substances, bitumen and the like have been removed by the usual methods of extraction for instance with tetrahydronaphthalene, benzol, acetone $SO_2$ or for example in such a manner that the water containing lignin chloride is treated with substances capable of adsorption, such as active carbon, active silicic acid, bleaching earths and the like. If desired a combined treatment may be carried out for example in such a manner that the water is first allowed to pass through a filter consisting for example of brown coal coke and then removing the residual quantities of lignin chloride by active carbon for example.

For carrying the invention into effect it is possible to use for example lignin which has been obtained from substances containing lignin. When decomposing initial substances containing cellulose and lignin, such as wood, by means of concentrated acid, particularly hydrochloric acid, the cellulose for example is converted into a form soluble in acid or exhaust products (types of sugar) whilst the lignin remains as residue. Such lignin, after purification, for example by washing, and after sterilization if desired, can be used in connection with a process of the present application.

Instead of lignin it is also possible to use substances containing lignin which do not impart disturbing impurities to the water. As such may be mentioned for example wood waste, such as saw-dust, wood-flour and the like.

The treatment of chlorinated water with lignin, saw-dust and the like may for example be carried out in such a manner that the water is filtered through the lignin or the lignin-containing substances or by bringing the water into intimate contact with solid substances by other suitable operations as for example vibrating methods.

*Examples*

1. Strong chlorinated water or chlorine water, the latter with a content of more than 3 grammes per litre, therefore, more than 3,000 times the quantity which is used for the dechlorination of drinking water, (less than 1 gramme chlorine per cubic metre of water) is filtered through lignin free from germs, produced according to Willstätter, or shaken therewith. With every 10 grammes of lignin it is possible to remove at least 5 grammes of chlorine so completely that examination of the water by known means will no longer enable any content of chlorine to be recognized. After filtration through active carbon or bleaching earth an entirely clear water having an excellent taste is obtained and which is free from any infectious germs.

2. Chlorinated water (for example 0.6 grammes chlorine per cubic metre) is filtered through wood (for example saw-dust, which is preferably free from resin, steamed and thus rendered free from germs), or shaken therewith. After a short time the water has been completely dechlorinated. If the initial water had a small content of chlorine it is capable of being used for edible purposes without any further subsequent treatment.

I claim:—

1. A water purifying process which comprises treating the water with chlorine or perchloride compounds, treating the chlorinated water with a lignin bearing material to convert the chlorine into lignin chloride and substantially continuously maintaining throughout the treatment the ratio between the lignin and the chlorine at a proportion of substantially 2 to 1 parts by weight or above.

2. A process according to claim 1, in which the water is treated with lignin-containing substances which do not impart impurities to the water.

3. A process according to claim 1, in which the water is treated with substances which contain lignin in combination with cellulose.

4. A process according to claim 1, in which the water is treated with comminuted wood.

5. A process for the removal of chlorine or perchloride compounds from water treated therewith, consisting in treating the water to be dechlorinated with lignin and then with substances which are capable of removing the lignin chloride which has been formed.

6. A process for the removal of chlorine or perchloride compounds from water treated therewith, consisting in treating the water with lignin and then treating it with substances which are capable of combining with the lignin chloride.

7. A process for the removal of chlorine or perchloride compounds from water treated therewith, consisting in treating the water to be dechlorinated with lignin and then treating it with carbon from which ulmic substances and bitumen have been removed.

8. A process for the removal of chlorine or perchloride compounds from water treated therewith, consisting in treating the water to be dechlorinated with lignin and then treating it with adsorption media.

9. A process for the removal of chlorine or perchloride compounds from water treated therewith, consisting in treating the water to be dechlorinated with lignin, then treating it with carbon from which ulmic substances and bitumen have been removed and finally treating it with active adsorption media.

In testimony whereof I affix my signature.

ERNST BERL.